United States Patent
Hong (10) Patent No.: US 7,337,337 B2
(45) Date of Patent: Feb. 26, 2008

(54) APPARATUS AND METHOD OF REDUCING POWER CONSUMPTION USING POWER-SAVE POLLING LIST

(75) Inventor: Seong-seol Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 540 days.

(21) Appl. No.: 10/755,413

(22) Filed: Jan. 13, 2004

(65) Prior Publication Data

US 2004/0141490 A1 Jul. 22, 2004

(30) Foreign Application Priority Data

Jan. 13, 2003 (KR) .................. 10-2003-0002085
Apr. 11, 2003 (KR) .................. 10-2003-0023057

(51) Int. Cl.
*G06F 1/00* (2006.01)
*G06F 1/26* (2006.01)
*G06F 1/32* (2006.01)

(52) U.S. Cl. ........................ 713/320; 713/300

(58) Field of Classification Search ................ 713/300, 713/320

See application file for complete search history.

(56) References Cited

U.S. PATENT DOCUMENTS

| | | | | |
|---|---|---|---|---|
| 5,132,680 A * | 7/1992 | Tezuka et al. | ............ | 340/3.51 |
| 5,297,144 A * | 3/1994 | Gilbert et al. | ............ | 370/346 |
| 6,542,495 B1 * | 4/2003 | Sugita | ................ | 370/347 |
| 6,721,285 B1 * | 4/2004 | Carro | ............. | 370/277 |
| 6,980,822 B2 * | 12/2005 | Conti et al. | ............ | 455/522 |
| 7,096,035 B2 * | 8/2006 | Gouessant et al. | ........ | 455/522 |
| 2002/0052215 A1 * | 5/2002 | Conti et al. | ............ | 455/522 |
| 2002/0159814 A1 * | 10/2002 | Frederic | .............. | 400/693 |
| 2002/0163928 A1 * | 11/2002 | Rudnick et al. | .......... | 370/444 |
| 2002/0176513 A1 * | 11/2002 | Gouessant et al. | ........ | 375/297 |
| 2004/0063401 A1 * | 4/2004 | Meckelburg et al. | ...... | 455/41.1 |

FOREIGN PATENT DOCUMENTS

| | | |
|---|---|---|
| KR | 2001-0032993 A | 4/2001 |
| KR | 2001-0073656 A | 8/2001 |

* cited by examiner

*Primary Examiner*—James K. Trusillo
*Assistant Examiner*—Michael J Brown
(74) *Attorney, Agent, or Firm*—Sughrue Mion, PLLC (57) ABSTRACT

An apparatus and method of reducing power consumption in a station on a wireless LAN is provided. Included is a cumulative lead time frame receiver, a self lead time frame production transmission unit, an inactive state cumulative lead time count unit, and an active state converter. When a predetermined station is in an active state, the cumulative lead time frame receiver receives a cumulative lead time frame including a cumulative lead time value from a coordinator. If the cumulative lead time value included in the cumulative lead time frame received by the cumulative lead time frame receiver is effective, the inactive state cumulative lead time count unit converts the active state of the predetermined station into an inactive state, in which less power is consumed. If the inactive state cumulative lead time count unit completes counting, the active state converter converts the inactive state into the active state.

39 Claims, 8 Drawing Sheets

| 2 | 2 | 6 | 1 | 4 |
|---|---|---|---|---|
| Frame Control | AID | BSS ID | Cumulative Lead Time | FCS |

FIG. 7

| 2 | 1 | 6 | 2 | 4 |
|---|---|---|---|---|
| Frame Control | Self Lead Time | RA | AID | FCS |

FIG. 8

| AID | ... | ... | Cumulative Lead Time | Self Lead Time | ... |
|---|---|---|---|---|---|
| 2 | | | 0 | 10 | |
| 5 | | ... | 10 | 0 | ... |
| 14 | | | 10 | 8 | |
| 28 | | | 18 | 0 | |
| 29 | | | 18 | 17 | |

APPARATUS AND METHOD OF REDUCING POWER CONSUMPTION USING POWER-SAVE POLLING LIST

BACKGROUND OF THE INVENTION

This application claims the priority of Korean Patent Application Nos. 2003-2085 and 2003-23057, filed on 13 Jan. 2003 and 11 Apr. 2003, respectively, in the Korean Intellectual Property Office, the disclosure of which is incorporated herein in its entirety by reference.

1. Field of the Invention

Apparatuses and methods consistent with the present invention relate to reducing power consumption in stations on a wireless LAN based on the IEEE 802.11 standard.

2. Description of the Related Art

According to the IEEE 802.11 standard ("standard"), a basic service set (BSS) including an access point (AP) is referred to as an infrastructure mode, and a BSS without APs is referred to as an ad-hoc mode. A collection of stations included in an ad-hoc mode is referred to as an independent BSS (IBSS). Among functions at a media access control (MAC) protocol, a distributed coordination function (DCF) and an enhanced DCF (EDCF), which provides a quality of service (QOS), are executed in only an ad-hoc mode. In the DCF and EDCF, a MAC protocol data unit (MPDU) is transmitted through contention. The period during which the MPDU is transmitted through contention is referred to as a contention period (CP). An infrastructure mode includes all of the functions practiced in an ad-hoc mode, such as, a point coordination function (PCF) and a hybrid coordination function (HCF), which provides a QOS. These functions are implemented according to a contention way and a polling way. The period during which an MPDU is transmitted through polling is referred to as a contention free period (CFP).

Figure 1:
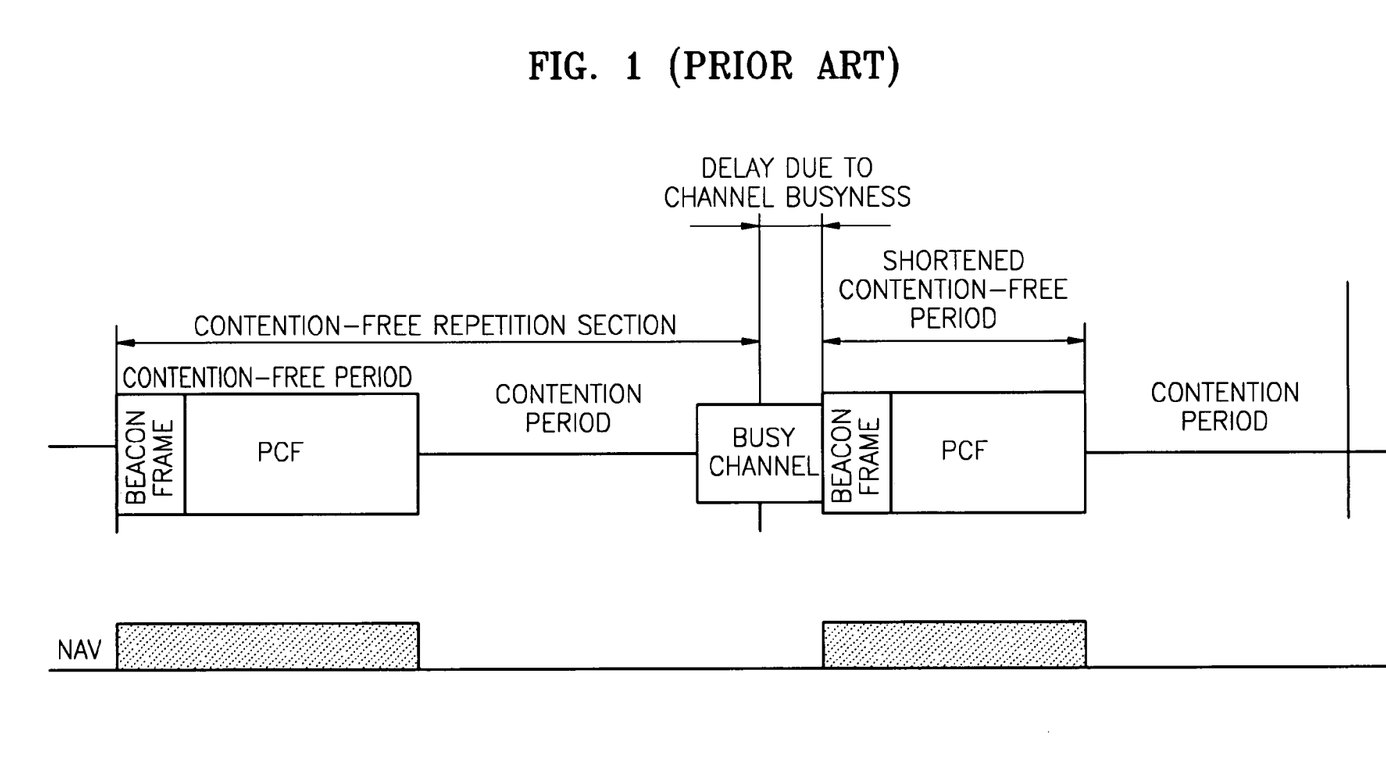
FIG. 1 shows a conventional DTIM.

FIG. 1 shows a conventional delivery traffic indication map (DTIM). A point coordinator makes a polling list on the basis of a Contention Free-pollable (CF-pollable) subfield and a Contention Free-poll (CF-poll) request subfield, which are included in an association request frame or a reassociation request frame. If each station receives a beacon frame depending on a DTIM, it starts a point coordination function.

Figure 2:
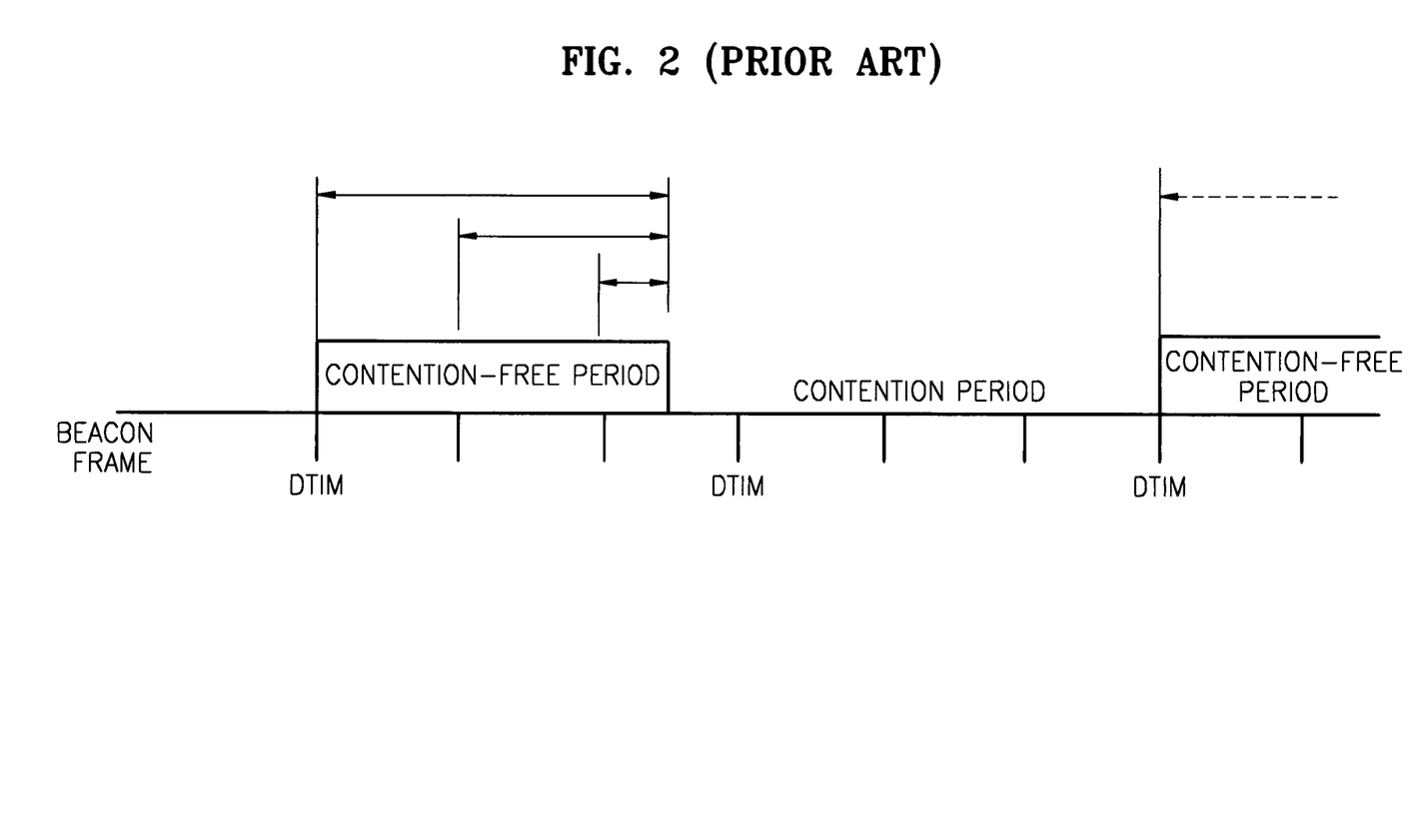
FIG. 2 shows a mechanism of a conventional PCF.

FIG. 2 shows a mechanism of a conventional PCF. During a CFP, stations registered in a polling list wait for being polled by a point coordinator. The point coordinator polls the stations on the polling list in an Association Identity-increasing (AID-increasing) order. The CFP may be shortened if a beacon frame is delayed due to channel busyness. Polled stations transmit data to the point coordinator. Unpolled stations wait for their turns while keeping an active state, in which the entire power is supplied, in order to receive a poll frame. Hence, in the conventional PCF mechanism, even stations not transmitting data at present are in an active state just for a moment to receive a poll frame, thus consuming much unnecessary power. The stations are generally mobile stations. In this case, the stations must be small and light, and accordingly, power consumption in the stations must be considered carefully.

SUMMARY OF THE INVENTION

The present invention provides an apparatus for reducing power consumption in a station by using a power-save polling list producing apparatus, and a method of reducing power consumption in a station by using a power-save polling list producing method.

According to an aspect of the present invention, there is provided a power-save polling list producing apparatus comprising a cumulative lead time frame transmitter, a self lead time frame receiver, and a power-save polling list producer. The cumulative lead time frame transmitter produces a cumulative lead time frame including a cumulative lead time value and transmits the cumulative lead time frame to a station. If there are one or more stations having higher polling priorities than the station, the cumulative lead time value represents the time required for data transmission by the higher priority stations. The self lead time frame receiver receives a self lead time frame including a self lead time value from the station. The self lead time value represents the time required for data transmission by the station. The power-save polling list producer adds the self lead time value included in the self lead time frame received by the self lead time frame receiver to the cumulative lead time value to produce a power-save polling list, which includes the self lead time value and the added cumulative lead time value.

According to another aspect of the present invention, there is provided an apparatus for reducing power consumption in a station, comprising a cumulative lead time frame receiver, a self lead time frame production transmission unit, an inactive state cumulative lead time count unit, and an active state converter. When a predetermined station is in an active state, the cumulative lead time frame receiver receives a cumulative lead time frame including a cumulative lead time value from a coordinator. The cumulative lead time value represents the time required for data transmission by stations having higher polling priorities than the predetermined station. When the station is in the active state, the self lead time frame production transmission unit produces a self lead time frame including a self lead time value and transmits the self lead time frame to the coordinator. The self lead time value represents the time required for data transmission by the predetermined station. If the cumulative lead time value included in the cumulative lead time frame received by the cumulative lead time frame receiver is effective, the inactive state cumulative lead time count unit converts the active state of the station into an inactive state, in which less power is consumed than in the active state. While the predetermined station is in the inactive state, the inactive state cumulative lead time count unit counts the cumulative lead time value. If the inactive state cumulative lead time count unit completes counting, the active state converter converts the inactive state into the active state.

According to another aspect of the present invention, there is provided a power consumption reducing apparatus comprising a power-save polling list producing unit and a station power consumption reducing unit. The power-save polling list producing unit produces a cumulative lead time frame for a predetermined station including a cumulative lead time value, which represents the time required for data transmission by one or more stations having a higher priority than the predetermined station, transmits the cumulative lead time frame to the predetermined station, receives a self lead time frame including a self lead time value from the predetermined station, the self lead time value representing the time required for data transmission by the predetermined station, adds the self lead time value included in the received self lead time frame to the cumulative lead time value, and produces a power-save polling list including both the self lead time value and the added cumulative lead time value. The station power consumption reducing unit receives the cumulative lead time frame from the coordinator and produces the self lead time frame. When the predetermined station is in an active state, the station power consumption reducing unit transmits the self lead time frame to the coordinator. If the cumulative lead time value included in the received cumulative lead time frame is effective, the station power consumption reducing unit converts the active state of the predetermined station into an inactive state. While the predetermined station is in the inactive state, the station power consumption reducing unit counts the cumulative lead time value. If the counting is completed, the station power consumption reducing unit converts the inactive state of the predetermined station into the active state.

According to another aspect of the present invention, there is provided a power-save polling list producing method comprising: producing a cumulative lead time frame including a cumulative lead time value and transmitting the cumulative lead time frame to a predetermined station, wherein if there are one or more stations having higher polling priorities than the predetermined station, the cumulative lead time value represents the time required for data transmission by the higher priority stations; receiving a self lead time frame including a self lead time value from the station, wherein the self lead time value represents the time required for data transmission by the predetermined station; and adding the self lead time value included in the received self lead time frame to the cumulative lead time value to produce a power-save polling list, which includes the self lead time value and the added cumulative lead time value.

According to another aspect of the present invention, there is provided a station power consumption reducing method comprising: receiving a cumulative lead time frame including a cumulative lead time value from a coordinator, when a predetermined station is in an active state, wherein the cumulative lead time value represents the time required for data transmission by one or more stations having a higher polling priority than the predetermined station; producing a self lead time frame including a self lead time value and transmitting the self lead time frame to the coordinator, when the predetermined station is in the active state, wherein the self lead time value represents the time required for data transmission by the predetermined station; converting the active state of the station into an inactive state, in which less power is consumed than in the active state, if the cumulative lead time value included in the received cumulative lead time frame is effective, and counting the cumulative lead time value while the predetermined station is in the inactive state; and converting the inactive state into the active state if the counting is completed.

According to another aspect of the present invention, there is provided a power consumption reducing method comprising: producing a cumulative lead time frame for a predetermined station including a cumulative lead time value, which represents the time required for data transmission by one or more stations having a higher priority than the predetermined station, transmitting the cumulative lead time frame to the predetermined station, receiving a self lead time frame including a self lead time value from the predetermined station, the self lead time value representing the time required for data transmission by the predetermined station, adding the self lead time value included in the received self lead time frame to the cumulative lead time value, and producing a power-save polling list including both the self lead time value and the added cumulative lead time value; and receiving the cumulative lead time frame from the coordinator, producing the self lead time frame, transmitting the self lead time frame to the coordinator, when the predetermined station is in an active state, and converting the active state of the station into an inactive state if the cumulative lead time value included in the received cumulative lead time frame is effective, counting the cumulative lead time value while the predetermined station is in the inactive state, and converting the inactive state of the predetermined station into the active state if the counting is completed.

According to another aspect of the present invention, there is provided a cumulative lead time frame comprising a cumulative lead time field in which a cumulative lead time value is recorded. If there are one or more stations having a higher polling priority than a predetermined station, the cumulative lead time value represents the time required for data transmission by the higher priority stations.

According to another aspect of the present invention, there is provided a self lead time frame comprising a self lead time field in which a self lead time value is recorded. If there are one or more stations having a higher polling priority than a predetermined station, the self lead time value represents the time required for data transmission by the predetermined station.

According to another aspect of the present invention, there is provided a power-save polling list comprising a cumulative lead time field in which a cumulative lead time value is recorded, and a self lead time field in which a self lead time value is recorded. If there are one or more stations having a higher polling priority over a predetermined station, the cumulative lead time value represents the time required for data transmission by the higher priority stations. The self lead time value represents the time required for data transmission by the predetermined station.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 3:
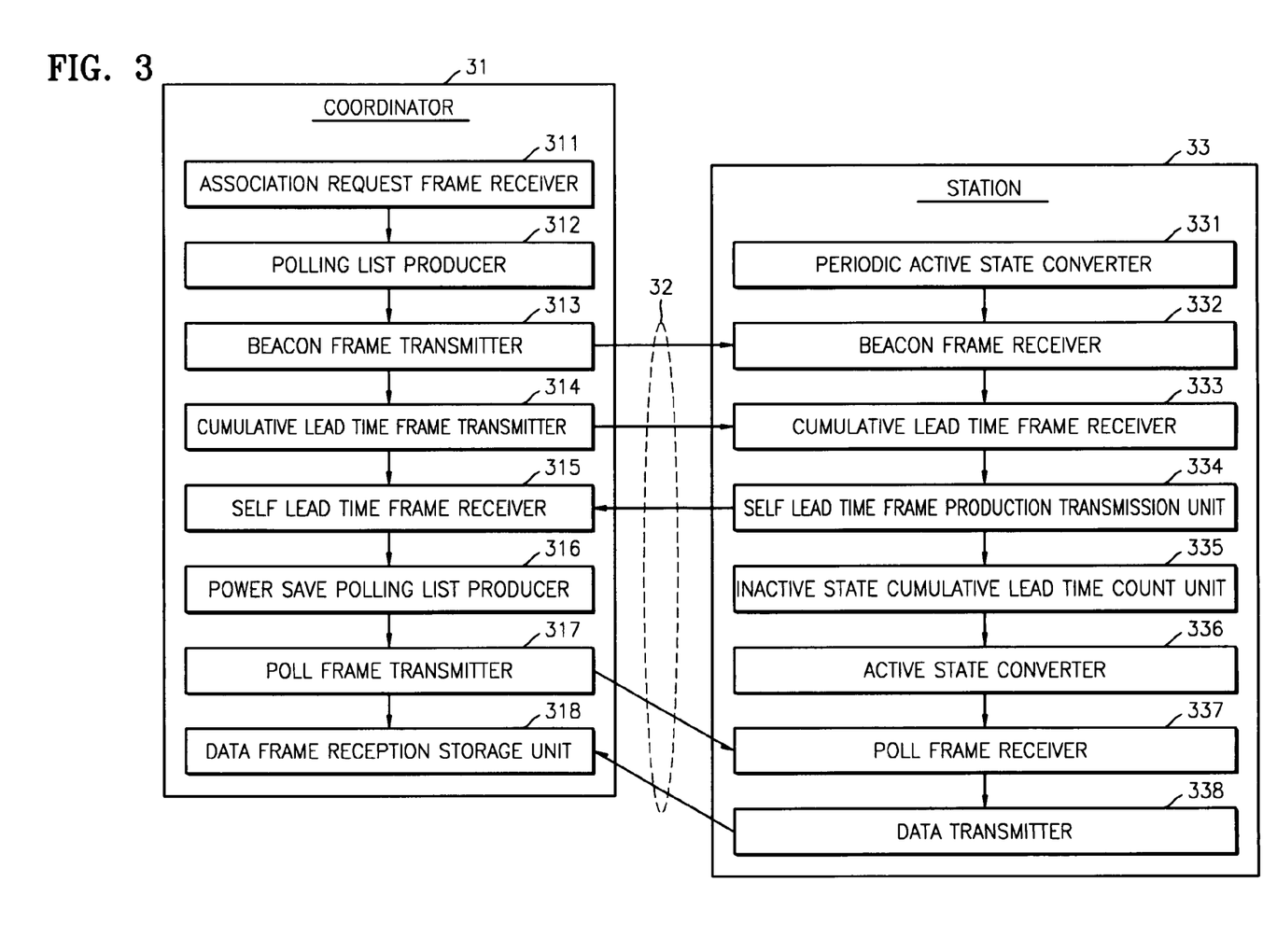
FIG. 3 shows a structure of a power consumption reducing apparatus according to an embodiment of the present invention.

Referring to FIG. 3, a power consumption reducing apparatus according to an embodiment of the present invention is comprised of a power save polling list producing device and a station power consumption reducing device. Since the present invention is applied to an infrastructure mode, the power save polling list producing device is installed in an access point (AP) 31, and the station power consumption reducing device is installed in a station 33 in a basic service set (BSS), in which the AP 31 serves as a coordinator. To be more exact, because a polling list is used in a point coordination function (PCF) or a hybrid coordination function (HCF) during a contention free period (CFP), an AP in the present invention serves as a point coordinator (PC) or a hybrid coordinator (HC). Accordingly, the AP 31 is referred to as a coordinator hereinafter.

Since an infrastructure mode is used in a wireless LAN, a communication channel between the coordinator 31 and the station 33 will be a channel 32, which uses a specific frequency. Hence, when the coordinator 31 or the station 33 transmits a frame, all of the other stations receive the frame at the same time, and stations needing the frame store the frame while stations not needing the frame discards the frame. In other words, transmission on the wireless LAN is broadcast-type transmission.

The power save polling list producing device mounted on the coordinator 31 includes an association request frame receiver 311, a polling list producer 312, a beacon frame transmitter 313, a cumulative lead time frame transmitter 314, a self lead time frame receiver 315, a power save polling list producer 316, a poll frame transmitter 317, and a data frame reception storage unit 318.

The association request frame receiver 311 receives an association request frame or a reassociation request frame from any station. During a CFP, the association request frame receiver 311 can receive a poll frame (which is also referred to as a CF-poll frame because the poll frame is used during a CFP), and stations wanting to be registered in a polling list set a CF-pollable subfield to be 1 and a CF-poll request subfield to be 0. The polling list producer 312 produces a polling list from a CF-pollable subfield and a CF-poll request subfield, which are included in the association or reassociation request frame received by the association request frame receiver 311. In other words, stations that transmitted the association or reassociation request frame in which a CF-pollable subfield and a CF-poll request subfield are set to be 1 and 0, respectively, are registered in a polling list. The first registered station has the highest priority on the polling list and receives a poll frame first. Transmission and reception of the association or reassociation request frame are achieved when a station belongs to a basic service set.

The beacon frame transmitter 313 produces a beacon frame including an interval value depending on a delivery traffic indication map (DTIM) and transmits the produced beacon frame to a station at intervals corresponding to the interval value. According to the IEEE 802.11 standard, the coordinator 31 starts a point coordination function by transmitting a beacon frame to stations included in a basic service set, which is managed by the coordinator 31, at intervals depending on the DTIM. In an infrastructure basic service set, a power control mechanism is concentrated on the coordinator 31, that is, an AP. Because the AP stores data and transmits the stored data at the request of a station, stations can exist in an inactive state for a long period of time. When a station is in a power save mode, that is, in an inactive state, the station must receive a beacon frame in order to know if a data frame waits for transmission to the station or in order to complete a successful frame handshake with an AP. The inactive state denotes a state in which minimum power necessary for conversion into an active state is supplied, and the active state denotes a state in which the entire power is supplied.

In an infrastructure mode, in which an AP controls stations, the stations are not required to be awake every time they receive a beacon frame, and also not required to be awake for a predetermined period of time after reception of a beacon frame. Hence, the infrastructure mode can save far more power than an independent basic service set without any APs. However, stations must be awake during a period of time determined by an AP, when multicast frames are received. The period of time is represented in a beacon frame depending on the DTIM.

If one or more stations having higher polling priorities than the station 33 having the station power consumption reducing device exist, the cumulative lead time frame transmitter 314 produces a cumulative lead time frame including a cumulative lead time value, which represents the time required for data transmission by the stations having higher priorities than the station 33, and transmits the produced cumulative lead time frame to the station 33. If no stations having a higher polling priority over the station 33 exist, the cumulative lead time frame transmitter 314 sets the cumulative lead time value to be an ineffective value, that is, 0, produces a cumulative lead time frame including the set cumulative lead time value 0, and transmits the cumulative lead time frame to the station 33. In other words, after the lapse of a period corresponding to a Short InterFrame Space (SIFS) after transmission of a beacon frame from the beacon frame transmitter 313, the cumulative lead time frame transmitter 314 produces a cumulative lead time frame including a cumulative lead time value, which represent the time required for data transmission by the higher priority stations, which have association identities (AIDs) in predetermined priorities on the polling list produced by the polling list producer 312. The cumulative lead time frame transmitter 314 transmits the produced cumulative lead time frame to the station 33, which has an AID in the priority lower than the predetermined priorities of the higher priority stations on the polling list.

An initial polling list has stations in each of which a CF-pollable subfield and a CF-poll request subfield have been set to be 1 and 0, respectively. In a station having an AID in the highest priority on the initial polling list, a cumulative lead time field has been set to be 0, because the station has no stations having a higher polling priority and, accordingly, no cumulative lead time for data transmission by higher priority stations is required. Since a series of numbers ranging within a basic service set are allocated to AIDs, the smallest-numbered AID represents the highest priority AID. The coordinator 31 transmits a cumulative lead time frame to the stations registered on the polling list in the order from the station having the highest priority AID to stations having lower priority AIDs. A station that has received a cumulative lead time frame stores the cumulative lead time value included in the cumulative lead time frame. The station containing the cumulative lead time value is in an inactive state, which is a power save mode, while higher priority stations are transmitting data to the coordinator 31, that is, during a period corresponding the stored cumulative lead time value. After the period has lapsed, the station containing the cumulative lead time value awakes to transmit data to the coordinator 31. As a result, power is saved.

The self lead time frame receiver 315 receives a self lead time frame including a self lead time value from the station 33. The self lead time value represents the time required for data transmission by the station 33. In response to the cumulative lead time frame, the station 33 transmits the self lead time frame to the coordinator 31 to inform the time required by the station to transmit data to the coordinator 31. The coordinator 31 receives the self lead time frame from the station 33.

The power save polling list producer 316 adds the self lead time value included in the self lead time frame received by the self lead time frame receiver 315 to the cumulative lead time value to obtain a power save polling list. The power save polling list includes the self lead time value and the added cumulative lead time value. In response to the received self lead time frame, the coordinator 31 updates the initial polling list. In other words, the self lead time value included in the received self lead time frame is recorded in the self lead time field of a station on the polling list corresponding to the station that has transmitted the self lead time frame. The added cumulative lead time value, to which the self lead time value has been added, is recorded in the cumulative lead time field of a station with an AID in the priority lower than the station that has transmitted the self lead time frame. If a station that has transmitted a self lead time frame has the highest priority AID, that is, AID 1, 0 μs will be recorded in the cumulative lead time field of a station with AID 1 on the polling list, and the time value required for data transmission, e.g., 10 μs, will be recorded in the self lead time field of the station with AID 1. If a station that has transmitted a self lead time frame has the second highest priority AID, that is, AID 2, 10 μs will be recorded in the cumulative lead time field of the station with AID 2 on the polling list, and the time value required for data transmission, e.g., 5 μs, will be recorded in the self lead time field of the station with AID 2. This process is repeated to all of the stations registered on the polling list to complete a power save polling list with information about the time at which each of the stations must awake.

The poll frame transmitter 317 produces a poll frame and transmits the poll frame to the station 33 and the higher priority stations, in a polling order defined on the power save polling list produced by the power save polling list producer 316. The data frame reception storage unit 318 receives a data frame from the station 33 and stores it. For example, the coordinator 31 transmits a poll frame to a station having the highest priority AID, e.g., AID 1, among the stations registered on the polling list. Since the station with AID 1 has been polled, it starts data transmission, and all of the other stations enter into a power save mode. At this time, among the stations registered on the polling list, a station with the second highest priority AID, e.g., AID 2, inputs a cumulative lead time value stored in itself to its local timer and starts the local timer. When the counting of the timer is completed, an inactive state, which is a power save mode, of the station with AID 2 is converted into an active state. When the station with AID 2 in an active state receives a poll frame from the coordinator 31, the station with AID 2 starts data transmission. This process is applied to each of the stations registered on the polling list. However, stations having a self lead time field value of 0, that is, having no data to be transmitted, on the polling list are excluded from being polled and continuously reside in an inactive state. Since these stations remain in an inactive state, power saving is maximized.

A subsequent process is based on the standard. In other words, if an AP has buffered multicast frames, these frames must be transmitted immediately after a beacon frame informs a station which receives the beacon frame of a DTIM. If there are a plurality of multicast frames to be transmitted, the AP can represent this fact by setting more data bits in a frame control field of each of the multicast frames excluding the multicast frame to be transmitted last. A station requests buffered frames from the AP by transmitting power-save poll frames to the AP. The AP will respond to each of the power-save poll frames, with data frames in which more data bits have been set. When the station receives the data frames having more data bits, it is requested to transmit power-save poll frames to the AP. The AP, which serves as a coordinator which operates a contention free period, uses the contention free period in order to transmit buffered frames to CF-pollable stations.

The station power consumption reducing device installed in the station 33 includes a periodic active state converter 331, a beacon frame receiver 332, a cumulative lead time frame receiver 333, a self lead time frame production transmission unit 334, an inactive state cumulative lead time count unit 335, an active state converter 336, a poll frame receiver 337, and a data transmitter 338.

The periodic active state converter 331 converts an inactive state obtained by the inactive state cumulative lead time count unit 335 into an active state at an interval depending on a DTIM. As described above, an active state denotes a state in which the entire power is supplied, and an inactive state denotes a state in which minimum power necessary for conversion into an active state is supplied. The interval value depending on a DTIM is recorded in a received beacon frame. Each station inputs the interval value to its local timer, starts counting, and enters into an active state when counting is completed. Thus, each station can receive a beacon frame.

The beacon frame receiver 332 receives a beacon frame including an interval value depending on a DTIM from the coordinator 31 when it is in an active state obtained by the periodic active state converter 331. As described above, the interval value informs a time at which a station must awake to receive the next beacon frame.

The cumulative lead time frame receiver 333, in an active state, receives a cumulative lead time frame including a cumulative lead time value from the coordinator 31. The cumulative lead time value represents the time required for data transmission by one or more stations having higher polling priorities than the station 33. If the station 33 has the second highest priority, that is, has AID 2, a station with AID 1 is a station having a priority higher than the station 33. In this case, the cumulative lead time frame receiver 333 receives a cumulative lead time frame containing the time value (e.g., 10 μs) required for data transmission by the station with AID 1.

The self lead time frame production transmission unit 334, in an active state, produces a self lead time frame including a self lead time value, which represent the time required for data transmission by the station 33, and transmits the self lead time frame to the coordinator 31. If the time required by the station 33 with AID 2 to transmit data is 5 μs, a self lead time frame containing 5 μs is transmitted to the coordinator 31.

The inactive state cumulative lead time count unit 335 converts an active state into an inactive state if the cumulative lead time value included in the cumulative lead time frame received by the cumulative lead time frame receiver 333 is effective, and counts the cumulative lead time value in an inactive state. If the received cumulative lead time value is not effective, the inactive state cumulative lead time count unit 335 converts an active state into an inactive state and counts by reducing a predetermined unit value, e.g., 1 µs, from the cumulative lead time value every counting interval.

The active state converter 336 converts the inactive state into an active state when the inactive state cumulative lead time count unit 335 completes counting. If the cumulative lead time value is 10 µs, and counting is executed by repeatedly reducing 1 µs at a time from the cumulative lead time of 10 µs, the inactive state can be converted into an active state after counting 10 times. The poll frame receiver 337 receives a poll frame in the active state obtained by the active state converter 336. After the lapse of a time corresponding to an SIFS after reception of the poll frame received by the poll frame receiver 337, the data transmitter 338 produces and transmits a data frame to the coordinator 31.

If the station 33 that has received a cumulative lead time frame has the highest priority, e.g., has AID 1, among the stations registered on the polling list, it has no higher priority stations. Accordingly, the cumulative lead time is 0 µs. In this case, the coordinator 31 transmits a poll frame to the station 33 with AID 1 first, and then the station 33 starts data transmission. If the station 33 that has received a cumulative lead time frame has the second highest priority, e.g., has AID 2, the station with AID 1 is a station having a priority higher than the station 33. Accordingly, the cumulative lead time is 10 µs. In this case, the coordinator 31 transmits a poll frame to the station 33 with AID 2, 10 µs after a poll frame has been transmitted to the station 33 with AID 1. Then, the station 33 starts data transmission. Hence, the station 33 containing the cumulative lead time of 10 µs is in an inactive state, which is a power save mode, while the station having a higher priority than the station 33 transmits data to the coordinator 31, that is, for 10 µs, which is the cumulative lead time. After the lapse of 10 µs, the station 33 enters into an active state in order to transmit data to the coordinator 31. When 10 µs has lapsed, that is, when the coordinator 31 has received data from the station with AID 1, the coordinator 31 transmits a poll frame to the station 33 with AID 2. The station 33 with AID 2 in an active state starts data transmission upon reception of the poll frame from the coordinator 31. This process is applied to each of the stations registered on the polling list. However, stations on the polling list that have a self lead time field value of 0, that is, stations having no data to be transmitted, are excluded from being polled and remain in an inactive state. Since these stations remain in an inactive state, power saving is maximized. A subsequent process is based on the standard.

Figure 4:
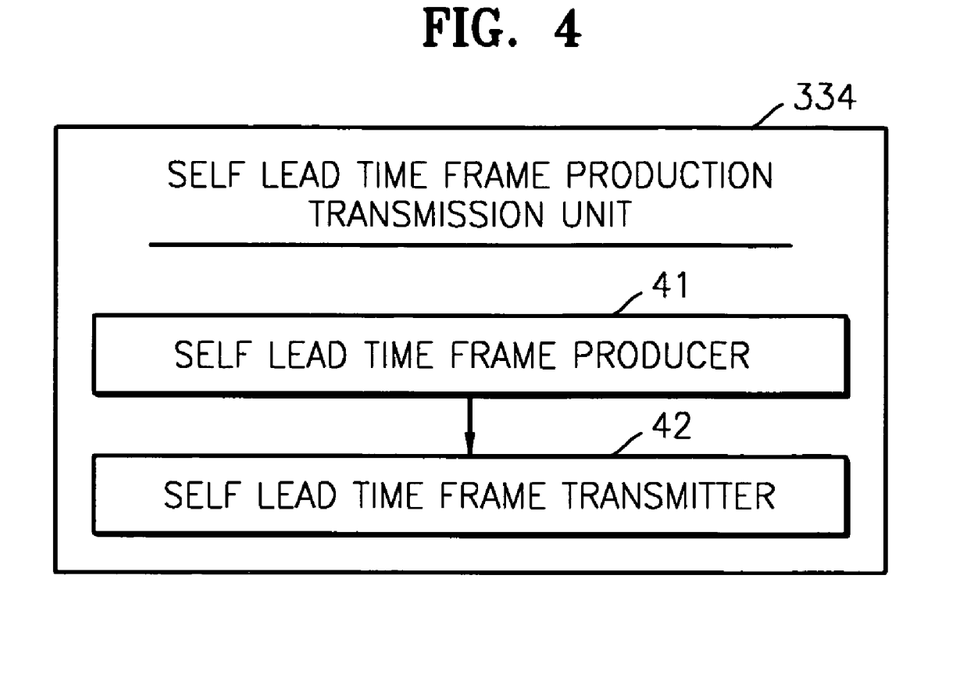
FIG. 4 shows a structure of the self lead time frame production transmission unit 334 of FIG. 3.

FIG. 4 shows a structure of the self lead time frame production transmission unit 334 of FIG. 3. The self lead time frame production transmission unit 334 includes a self lead time frame producer 41 and a self lead time frame transmitter 42.

The self lead time frame producer 41 calculates a self lead time value, which represents the time required by a station that has received a cumulative lead time frame to transmit a data frame to a coordinator, and produces a self lead time frame including the self lead time value. The self lead time frame transmitter 42 transmits the self lead time frame to the coordinator.

Figure 5:
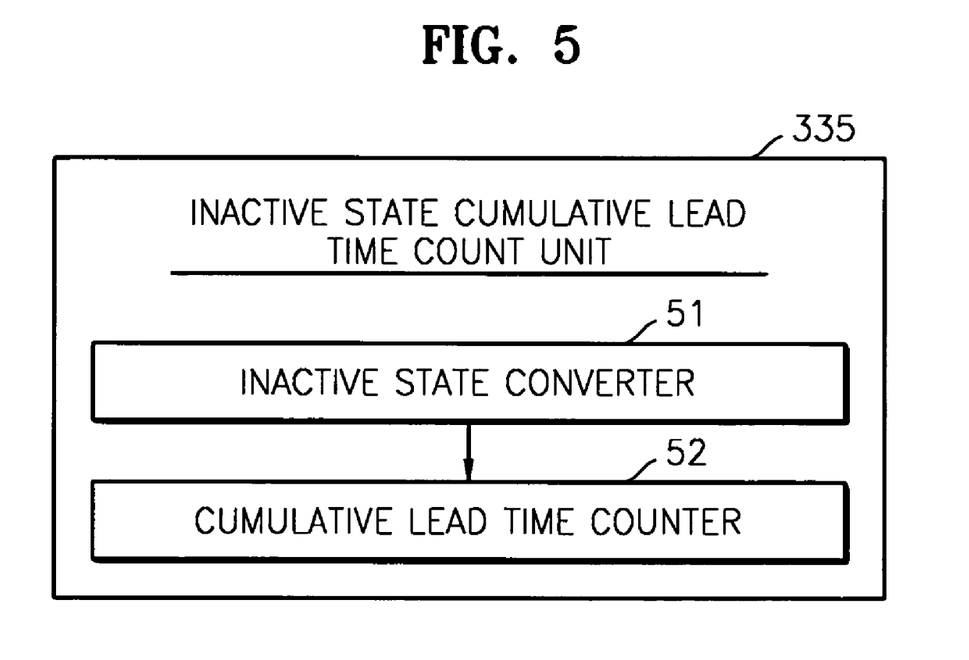
FIG. 5 shows a structure of the inactive state cumulative lead time count unit 335 of FIG. 3.

FIG. 5 shows a structure of the inactive state cumulative lead time count unit 335 of FIG. 3. The inactive state cumulative lead time count unit 335 includes an inactive state converter 51 and a cumulative lead time counter 52.

The inactive state converter 51 converts an active state into an inactive state when a self lead time frame is received from the self lead time frame production transmission unit 334 and a received cumulative lead time value is effective. The cumulative lead time counter 52 counts the cumulative lead time value, in an inactive state obtained by the inactive state converter 51. As described above, the counting is executed by reducing a predetermined unit value, for example, 1 µs, from the cumulative lead time value at intervals.

Figure 6:
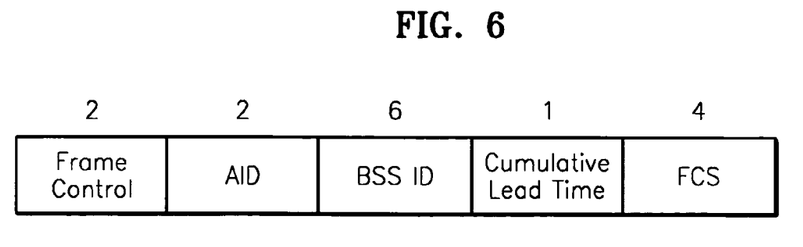
FIG. 6 shows a format of a cumulative lead time frame according to an embodiment of the present invention.

FIG. 6 shows a format of a cumulative lead time frame according to an embodiment of the present invention. The cumulative lead time frame is transmitted by a coordinator to each of the stations on a polling list, in order of registration on the polling list, that is, in order from low AID numbers to high AID numbers. The stations that have received a cumulative lead time frame from the coordinator can know the destination of the received frame by referring to a 2-octet AID field of the received frame. If the destination of the received frame is not the station that has received it, the station ignores the received frame. A one-octet cumulative lead time field of the received cumulative lead time frame stores a cumulative lead time value that represents the time required for data transmission by one or more stations having a higher priority than the station that has received the cumulative lead time frame. Each of the stations can know when it must be converted from an inactive state into an active state, by referring to the value of the cumulative lead time field. The fields shown in FIG. 6 are basically required by the cumulative lead time frame according to the embodiment of the present invention. A 2-octet frame control field represents the type of frame, such as, a data frame, a control frame, a management frame, or the like. A 6-octet basic service set ID (BSS ID) field represents the ID of a BSS. A 4-octet frame check sequence (FCS) field represents an FCS based on IEEE 802 LAN standard.

Figure 7:
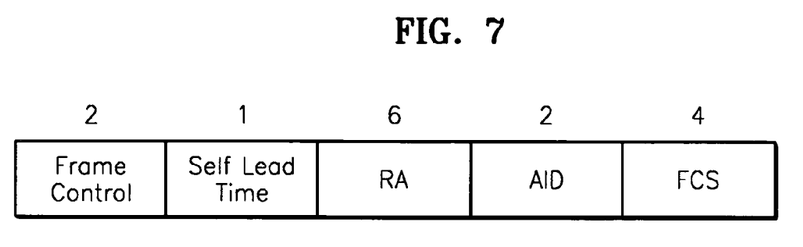
FIG. 7 shows a format of a self lead time frame according to an embodiment of the present invention.

FIG. 7 shows a format of a self lead time frame according to an embodiment of the present invention. The self lead time frame is transmitted by each station to a coordinator. In other words, a station that has received a cumulative lead time frame from the coordinator transmits the self lead time frame as an Acknowledge (ACK) message to the coordinator. At this time, the station that has received a cumulative lead time frame calculates the time required by the station to transmit data to the coordinator and records the calculated time value in a 1-octet self lead time field of the self lead time frame. The fields shown in FIG. 7 are basically required by the self lead time frame according to the embodiment of the present invention. A 2-octet frame control field represents the type of frame, such as, a data frame, a control frame, a management frame, or the like. A 6-octet receiver address (RA) field represents the address of a receiver of an ACK frame. A 2-octet AID field represents the ID of a station included in a BSS. A 4-octet FCS field represents an FCS based on IEEE 802 LAN standard.

Figure 8:
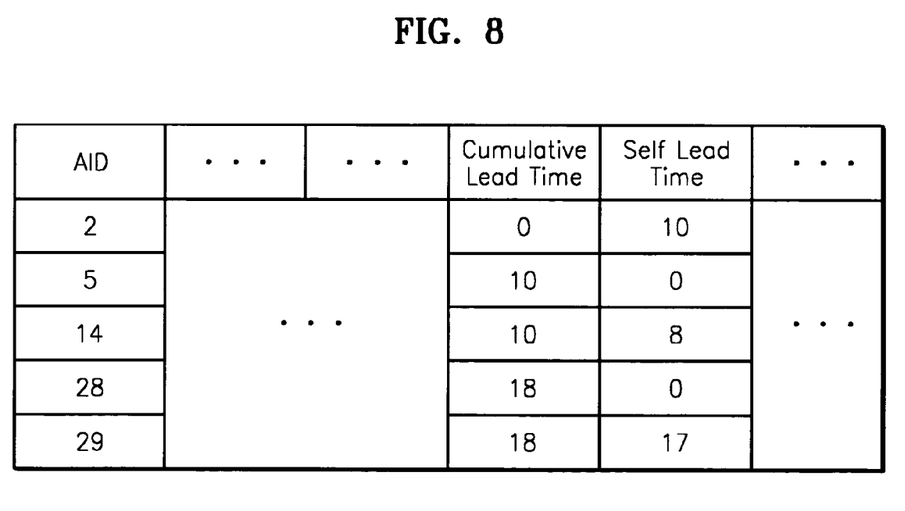
FIG. 8 shows a format of a power-save polling list according to an embodiment of the present invention.

FIG. 8 shows a format of a power-save polling list according to an embodiment of the present invention. The power-save polling list is produced by adding a cumulative lead time field and a self lead time field to a general polling list. A coordinator transmits a cumulative lead time frame to each of the stations registered on a polling list in order to inform the time when each of the stations must be converted from an inactive state into an active state. Each of the stations transmits a self lead time frame to the coordinator in order to inform the time required to transmit data to the coordinator. The coordinator receives the self lead time frame and completes the cumulative lead time field and the self lead time field of a polling list, using the self lead time field of the received self lead time frame. Referring to the power-save polling list of FIG. 8, stations operating during a contention control period have AID 2, AID 5, AID 14, AID 28, and AID 29.

The value of the cumulative lead time field of the station with AID 2 is 0 μs, and the value of the self lead time field thereof is 10 μs. Because the station with AID 2 has the highest priority among the operating stations, there are no stations having a higher priority than the station with AID 2, and accordingly, the station AID 2 has a cumulative lead time field of 0 μs. Since the station with AID 2 has a self lead time field value of 10 μs, the time required by the station with AID 2 to transmit data to an AP is 10 μs. The value of the cumulative lead time field of the station with AID 5 is 10 μs, and the value of the self lead time field thereof is 0 μs. Because the self lead time of the station with AID 2, which is a station having a higher priority than the station with AID 5, is 10 μs, the value of the cumulative lead time field of the station with AID 5 is 10 μs. From the self lead time field value 0 μs, it can be seen that the station with AID 5 has no data to be transmitted. Later, the station with AID 5 is excluded from being polled and remains in an inactive state. The value of the cumulative lead time field of the station with AID 14 is 10 μs, and the value of the self lead time field thereof is 8. Because the self lead time values of the stations with AID 2 and with AID 5, which are stations having higher priorities than the station with AID 14, are 10 μs and 0 μs, respectively, the cumulative lead time field value of the station with AID 14 is 10 μs. From the self lead time field value of 8 μs, it can be seen that the time required by the station with AID 14 to transmit data to an AP is 8 μs. The value of the cumulative lead time field of the station with AID 28 is 18 μs, and the value of the self lead time field thereof is 0 μs. Because the self lead time values of the stations with AID 2, with AID 5, and with AID 14, which are stations having higher priorities than the station with AID 28, are 10 μs, 0 μs, and 8 μs, respectively, the cumulative lead time field value of the station with AID 28 is 18 μs. From the self lead time field value 0 μs, it can be seen that the station with AID 28 has no data to be transmitted. Later, the station with AID 28 is excluded from being polled and remains in an inactive state. The value of the cumulative lead time field of the station with AID 29 is 18 μs, and the value of the self lead time field thereof is 17 μs. Because the self lead time values of the stations with AID 2, with AID 5, with AID 14, and with AID 28, which are stations having higher priorities than the station with AID 29, are 10 μs, 0 μs, 8 μs, and 0 μs, respectively, the cumulative lead time field value of the station with AID 29 is 18 μs. From the self lead time field value of 17 μs, it can be seen that the time required by the station with AID 29 to transmit data to an AP is 17 μs. From FIG. 8, the station with AID 14 has the smallest data to be transmitted, and the station with AID 29 has the largest data to be transmitted.

Figure 9:
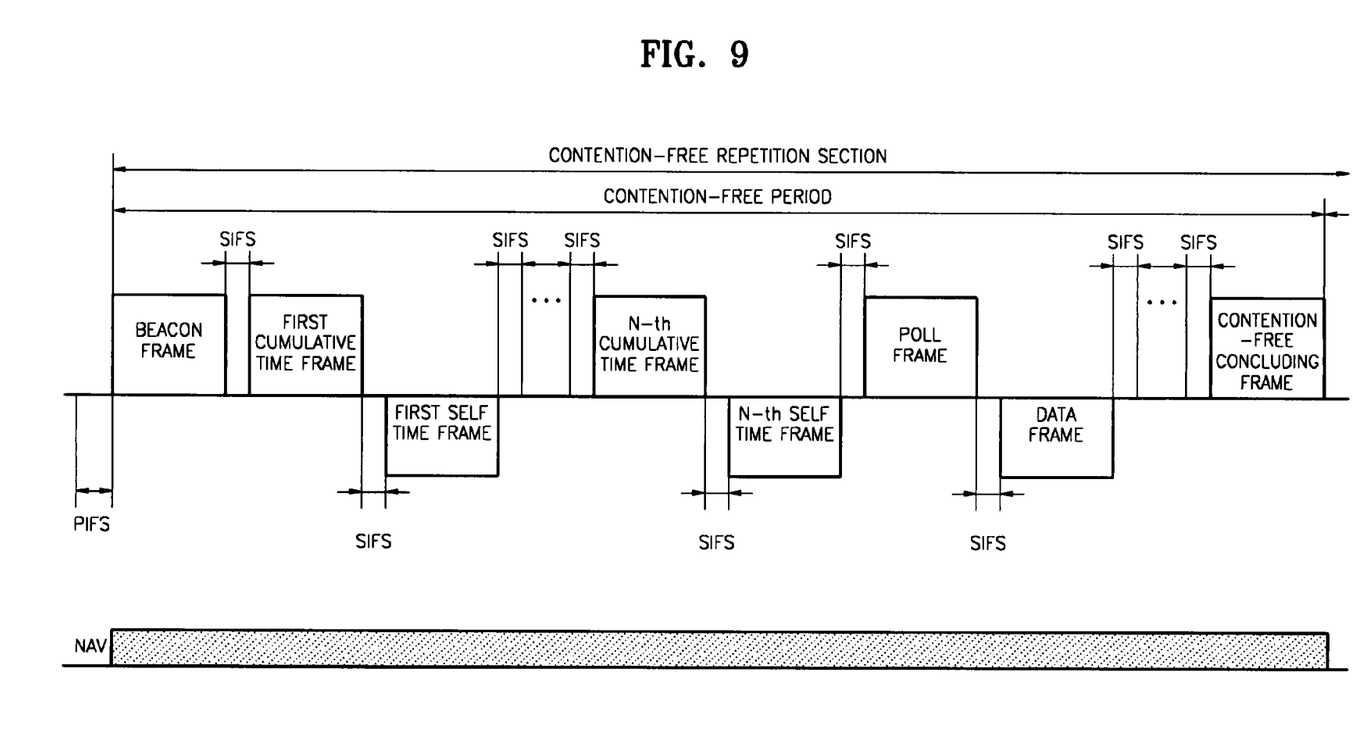
FIG. 9 illustrates a process according to the present invention in which several frames are transmitted and received.

FIG. 9 illustrates a process according to the present invention in which several frames are transmitted and received. The frame transmission and reception process of FIG. 9 is based on a network allocation vector (NAV). When a channel is idle during a period corresponding to a priority interframe space (PIFS), a coordinator transmits a beacon frame and each of the stations included in a BBS receive the beacon frame. After a period corresponding to a short interframe space (SIFS), the coordinator transmits a first cumulative lead time frame to a station having the highest priority among the stations included in the BBS, and the station with the highest priority receives the first cumulative lead time frame. After another SIFS period, the station with the highest priority transmits a first self lead time frame to the coordinator, and the coordinator receives the first self lead time frame. This process is repeated until the coordinator transmits an N-th cumulative lead time frame to a station having the lowest priority among the stations included in the BBS. Thereafter, the station with the lowest priority receives the N-th cumulative lead time frame. After another SIFS period, the station with the lowest priority transmits an N-th self lead time frame to the coordinator, and the coordinator receives the N-th self lead time frame. When all cumulative lead time frames and all self lead time frames are completely transmitted and received, a power-save polling list is completed. According to the power-save polling list, the coordinator transmits a poll frame to each station. When the station awakes in accordance with a cumulative lead time and receives the poll frame, it transmits a data frame to the coordinator.

Figure 10:
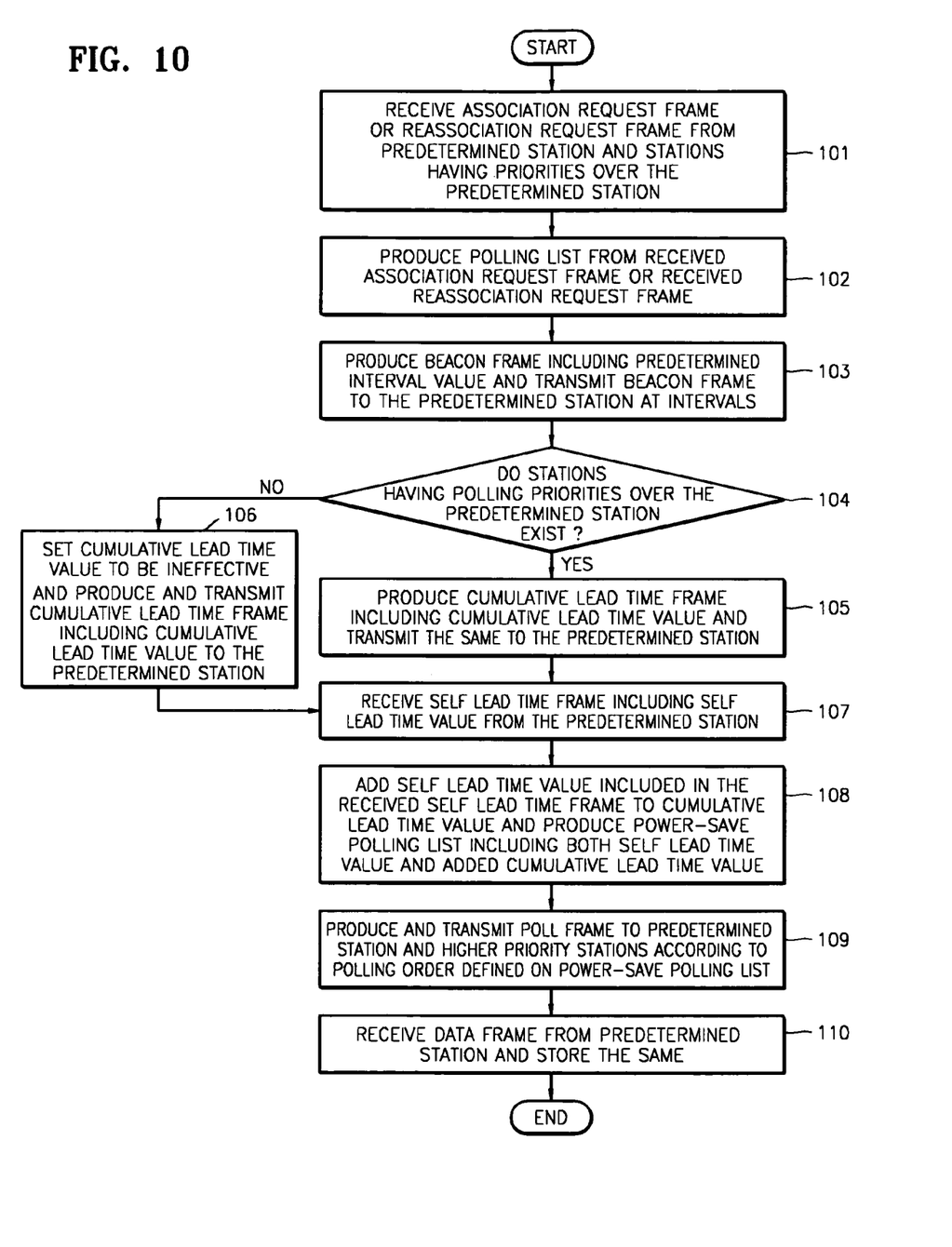
FIG. 10 is a flowchart illustrating a power save polling list producing method according to an embodiment of the present invention.

FIG. 10 is a flowchart illustrating a power-save polling list producing method according to an embodiment of the present invention. First, in step 101, an association request frame or a reassociation request frame is received from a predetermined station and stations having higher priorities than the predetermined station. In step 102, a polling list is produced from some of the field values included in the received association request frame or reassociation request frame. In step 103, a beacon frame including a predetermined interval value is produced, and the beacon frame is transmitted to the predetermined station at an interval corresponding to the predetermined interval value.

If it is determined in step 104 that one or more stations having higher polling priorities than the predetermined station exist, a cumulative lead time frame including a cumulative lead time value, which represents the time required for data transmission by the higher priority stations, is produced and transmitted to the predetermined station, in step 105. If it is determined in step 104 that no stations having higher polling priorities than the predetermined station exist, the cumulative lead time value is set to be ineffective, a cumulative lead time frame including the ineffective cumulative lead time value is produced and transmitted to the predetermined station, in step 106. In other words, after the lapse of an SIFS period after the transmission of the beacon frame, a cumulative lead time frame for a predetermined station is produced, including a cumulative lead time value representing the time required for data transmission by one or more stations with IDs having a higher priority than the predetermined station on the produced polling list. The produced cumulative lead time frame is transmitted to the station with an ID having a lower priority than the higher priority stations on the polling list.

Thereafter, in step 107, a self lead time frame including a self lead time value, which represents the time required for data transmission by the predetermined station, is received from the predetermined station. In step 108, the self lead time value included in the received self lead time frame is added to the cumulative lead time value to produce a power-save polling list. The power-save polling list includes the self lead time value and the added cumulative lead time value. In step 109, according to a polling order defined on the power-save polling list, a poll frame is produced and transmitted to the predetermined station and the higher priority stations. In step 110, a data frame is received from the predetermined station and stored.

Figure 11:
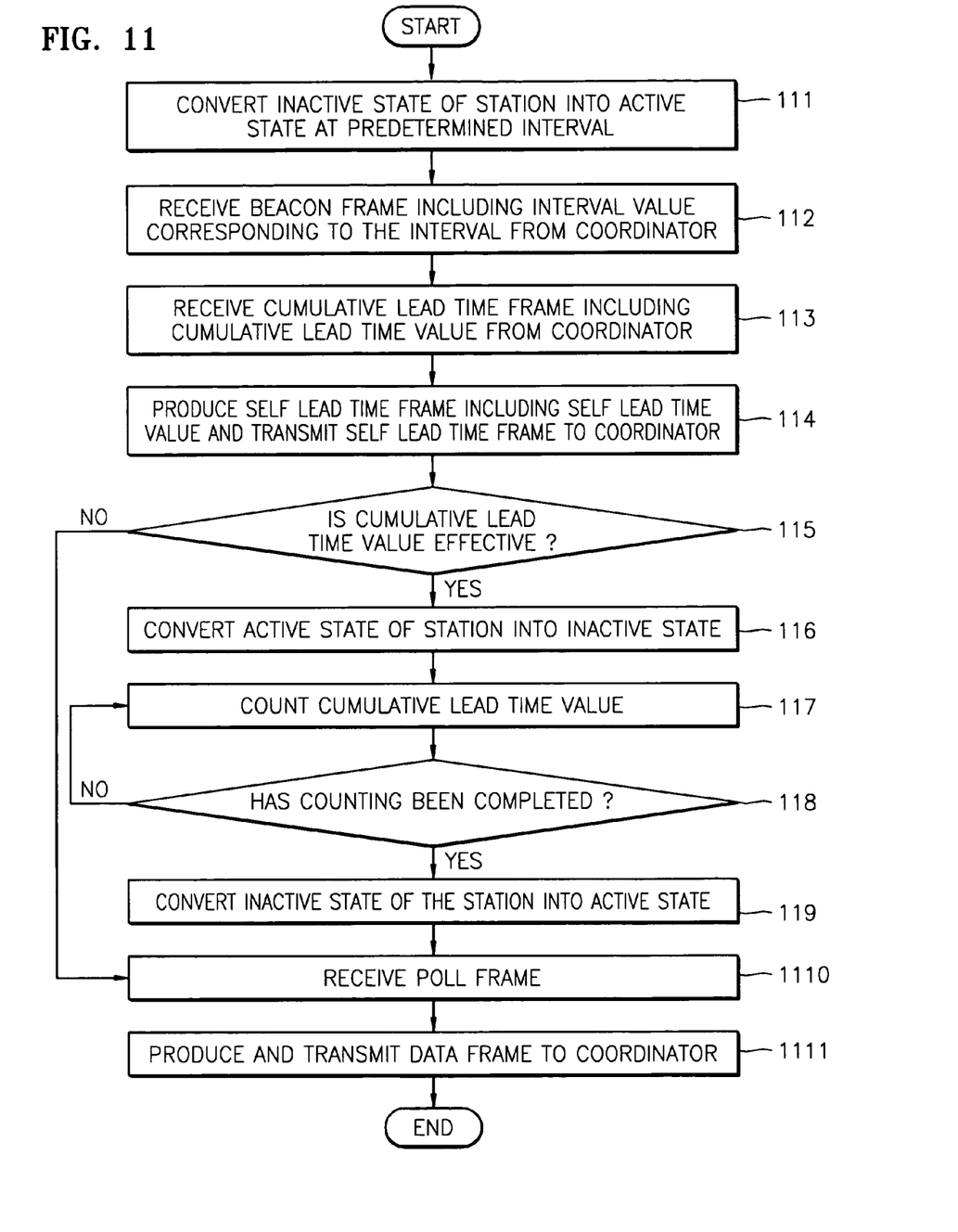
FIG. 11 is a flowchart illustrating a station power consumption reducing method according to an embodiment of the present invention.

FIG. 11 is a flowchart illustrating a station power consumption reducing method according to an embodiment of the present invention. First, in step 111, an inactive state of a station is converted into an active state at a predetermined interval. In step 112, the station in an active state receives a beacon frame including an interval value corresponding to the interval from a coordinator. The active state denotes a state in which the entire power is supplied, and the inactive state denotes a state in which minimum power necessary for conversion into an active state is supplied.

In step 113, the station in an active state receives a cumulative lead time frame including a cumulative lead time value from the coordinator. The cumulative lead time value represents the time required for data transmission by the stations having higher polling priorities than the predetermined station. In step 114, the station in an active state produces a self lead time frame including a self lead time value that represents the time required by data transmission by the predetermined station and transmits the self lead time frame to the coordinator. In other words, in step 114, the station in an active state calculates a self lead time value, which represents the time required by the predetermined station to transmit a data frame to the coordinator, and produces a self lead time frame including the calculated self lead time value.

If it is determined in step 115 that the cumulative lead time value included in the received cumulative lead time frame is effective, the active state of the predetermined station is converted into an inactive state, in step 116. In step 117, the predetermined station in an inactive state counts the cumulative lead time value by reducing a predetermined unit value from the cumulative lead time value at intervals. In other words, in the case where the self lead time frame is transmitted, it is determined in step 115 that the cumulative lead time value included in the received cumulative lead time frame is effective, the active state of the predetermined station is converted into an inactive state, in step 116. Thereafter, in step 117, the predetermined station in an inactive state counts the cumulative lead time value. If it is determined in step 115 that the cumulative lead time value included in the received cumulative lead time frame is ineffective, step 1110 to be described later is performed.

If it is determined in step 118 that the counting in step 117 is completed, the inactive state of the predetermined station is converted into an active state, in step 119. In step 1110, the station in an active sate receives a poll frame. After a period of time, in step 1111, the station in an active state produces and transmits a data frame to the coordinator.

The embodiment of the present invention can be written as computer programs and can be implemented in general-use digital computers that execute the programs using a computer readable recording medium. The data structure used in the embodiment of the present invention can be written in a computer readable recording medium in many ways. Examples of computer readable recording media include magnetic storage media (e.g., ROM, floppy disks, hard disks, etc.), optical recording media (e.g., CD-ROMs, or DVDS), and a storage medium such as a carrier wave (e.g., transmission through the Internet).

The many features and advantages of the invention are apparent from the detailed specification and, thus, it is intended by the appended claims to cover all such features and advantages of the invention that fall within the true spirit and scope of the invention. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

According to the present invention, a station stays in an inactive state, that is, in a power save mode, and is converted from the inactive state into an active state to receive a poll frame from a coordinator. The station in an active state receives a poll frame and transmits data, thereby greatly reducing the power consumption. Furthermore, since stations having no data to be transmitted do not need to receive a poll frame, they remain in an inactive state. Thus, the power consumption is minimized.

What is claimed is:

1. A power-save polling list producing device comprising:
   a cumulative lead time frame transmitter producing a cumulative lead time frame including a cumulative lead time value and transmitting the cumulative lead time frame to a first station, wherein if there is at least one higher priority station having a higher polling priority than the first station, the cumulative lead time value represents a time required for data transmission by the at least one higher priority station;
   a self lead time frame receiver receiving a self lead time frame including a self lead time value from the first station, wherein the self lead time value represents a time required for data transmission by the first station; and
   a power-save polling list producer adding the self lead time value included in the self lead time frame received by the self lead time frame receiver to the cumulative lead time value to generate an added cumulative lead time value and to produce a power-save polling list, which includes the self lead time value and the added cumulative lead time value.

2. The power-save polling list producing device of claim 1, wherein if there are no higher priority stations, the cumulative lead time frame transmitter sets the cumulative lead time value to be ineffective as an ineffective cumulative lead time value, produces the cumulative lead time frame including the ineffective cumulative lead time value, and transmits the cumulative lead time frame to the first station.

3. The power-save polling list producing device of claim 1, further comprising a beacon frame transmitter which produces a beacon frame including a predetermined interval value and transmits the beacon frame, in a transmission, to the first station at intervals corresponding to the predetermined interval value.

4. The power-save polling list producing device of claim 3, further comprising:
   an association request frame receiver receiving an association request frame or a reassociation request frame from each of the at least one higher priority station and the first station; and
   a polling list producer producing a polling list from at least one of field values included in one of the association request frame and the reassociation request frame received by the association request frame receiver.

5. The power-save polling list producing device of claim 4, wherein after a lapse of a predetermined period of time after the transmission of a beacon frame by the beacon frame transmitter, the cumulative lead time frame transmitter produces the cumulative lead time frame including the cumulative lead time value, which represents the time required for data transmission by the at least one higher priority station, wherein each of the at least one higher priority station has a respective Identity (ID) of a predetermined priority on the polling list produced by the polling list producer, and transmits the cumulative lead time frame to the first station with a station ID of a priority lower than the all of the respective IDs of each of the at least one higher priority station on the polling list.

6. The power-save polling list producing device of claim 1, further comprising:
- a poll frame transmitter producing and transmitting a poll frame to the at least one higher priority station and the first station according to a polling sequence defined on the power-save polling list produced by the power-save polling list producer; and
- a data frame reception storage unit receiving a data frame from the first station and storing the data frame.

7. A station power consumption reducing device comprising:
- a cumulative lead time frame receiver receiving a cumulative lead time frame including a cumulative lead time value from a coordinator, when a predetermined station is in an active state, wherein the cumulative lead time value represents a time required for data transmission by at least one higher priority station having a higher polling priority than the predetermined station;
- a self lead time frame production transmission unit producing a self lead time frame including a self lead time value and transmitting the self lead time frame to the coordinator, when the predetermined station is in the active state, wherein the self lead time value represents a time required for data transmission by the predetermined station;
- an inactive state cumulative lead time count unit converting the active state of the predetermined station into an inactive state, in which less power is consumed than in the active state, if the cumulative lead time value included in the cumulative lead time frame received by the cumulative lead time frame receiver is effective, and counting the cumulative lead time value while the predetermined station is in the inactive state; and
- an active state converter converting the inactive state into the active state if the inactive state cumulative lead time count unit completes the counting.

8. The station power consumption reducing device of claim 7, wherein the active state denotes a state in which a frill power is supplied, and the inactive state denotes a state in which a minimum power necessary for conversion into the active sate is supplied.

9. The station power consumption reducing device of claim 7, wherein the self lead time frame production transmission unit comprises:
- a self lead time frame producer calculating the self lead time value, which represents the time required by the predetermined station to transmit a data frame to the coordinator, and producing the self lead time frame including the self lead time value; and
- a self lead time frame transmitter transmitting the self lead time frame produced by the self lead time value producer to the coordinator.

10. The station power consumption reducing device of claim 7, wherein if the cumulative lead time value is ineffective, the inactive state cumulative lead time count unit converts the active state of the predetermined station into the inactive state.

11. The station power consumption reducing device of claim 7, wherein the inactive state cumulative lead time count unit counts by reducing a predetermined unit value from the cumulative lead time value at counting intervals.

12. The station power consumption reducing device of claim 7, wherein the inactive state cumulative lead time count unit comprises:
- an inactive state converter converting the active state of the predetermined station into the inactive state, when the self lead time frame production transmission unit has transmitted the self lead time frame to the coordinator and the cumulative lead time value is effective; and
- a cumulative lead time counter counting the cumulative lead time value while the predetermined station is in the inactive state.

13. The station power consumption reducing device of claim 7, further comprising:
- a periodic active state converter converting the inactive state obtained by the inactive state cumulative lead time count unit into the active state at intervals; and
- a beacon frame receiver receiving a beacon frame including a value of one of the intervals from the coordinator, when the predetermined station is in the active state.

14. The station power consumption reducing device of claim 7, further comprising:
- a poll frame receiver receiving a poll frame when the predetermined station is in the active state; and
- a data frame transmitter producing and transmitting a data frame to the coordinator, after a lapse of a predetermined period of time after a reception of the poll frame received by the poll frame receiver.

15. A power consumption reducing apparatus comprising:
- a power-save polling list producing unit producing a cumulative lead time frame for a predetermined station including a cumulative lead time value, which represents a time required for data transmission by at least one higher priority station having a higher priority than the predetermined station, transmitting the cumulative lead time frame to the predetermined station, receiving a self lead time frame including a self lead time value from the predetermined station, the self lead time value representing a time required for data transmission by the predetermined station, adding the self lead time value included in the self lead time frame to the cumulative lead time value to generate an added cumulative lead time value, and producing a power-save polling list including both the self lead time value and the added cumulative lead time value; and
- a station power consumption reducing unit receiving the cumulative lead time frame from a coordinator, producing the self lead time frame, transmitting the self lead time frame to the coordinator, when the predetermined station is in an active state, and converting the active state of the predetermined station into an inactive state if the cumulative lead time value included in the cumulative lead time frame is effective, counting the cumulative lead time value while the predetermined station is in the inactive state, and converting the inactive state of the predetermined station into the active state if the counting is completed.

16. A power-save polling list producing method comprising:
- producing a cumulative lead time frame including a cumulative lead time value and transmitting the cumulative lead time frame to a predetermined station, wherein if there is at least one higher priority station having a higher polling priority than the predetermined station, the cumulative lead time value represents a time required for data transmission by the at least one higher priority station;
- receiving a self lead time frame including a self lead time value from the predetermined station, wherein the self lead time value represents a time required for data transmission by the predetermined station; and
- adding the self lead time value included in the self lead time frame to the cumulative lead time value to generate an added cumulative lead time value and to produce a power-save polling list which includes the self lead time value and the added cumulative lead time value.

17. The power-save polling list producing method of claim 16, wherein in the producing the cumulative lead time frame, if there are no higher priority stations having higher polling priorities than the predetermined station, the cumulative lead time value is set to be ineffective as an ineffective cumulative lead time value, and the cumulative lead time frame including the ineffective cumulative lead time value is produced and transmitted to the predetermined station.

18. The power-save polling list producing method of claim 16, further comprising producing a beacon frame including a predetermined interval value and transmitting the beacon frame to the predetermined station at intervals corresponding to the predetermined interval value.

19. The power-save polling list producing method of claim 18, further comprising:
receiving an association request frame or a reassociation request frame from the at least one higher priority station and the predetermined station; and
producing a polling list from at least one of field values included in the association request frame or the reassociation request frame.

20. The power-save polling list producing method of claim 19, wherein a predetermined period of time after the producing the beacon frame, in the producing the cumulative lead time frame, the cumulative lead time frame including the cumulative lead time value, which represents the time required for data transmission by the at least one higher priority station, wherein each of the at least one higher priority station has a respective Identity (ID) of a predetermined priority on the polling list produced in the producing the polling list, is produced and transmitted to the predetermined station with a station ID of a priority lower than the all of the respective IDs of each of the at least one higher priority station on the polling list.

21. The power-save polling list producing method of claim 16, further comprising:
producing and transmitting a poll frame to the at least one higher priority station and the predetermined station according to a polling sequence defined on the power-save polling list produced in the adding the self lead time value; and
receiving a data frame from the predetermined station and storing the data frame.

22. A station power consumption reducing method comprising:
receiving a cumulative lead time frame including a cumulative lead time value from a coordinator, when a predetermined station is in an active state, wherein the cumulative lead time value represents a time required for data transmission by at least one higher priority station having a higher polling priority than the predetermined station;
producing a self lead time frame including a self lead time value and transmitting the self lead time frame to the coordinator, when the predetermined station is in the active state, wherein the self lead time value represents a time required for data transmission by the predetermined station;
converting the active state of the predetermined station into an inactive state, in which less power is consumed than in the active state, if the cumulative lead time value included in the received cumulative lead time frame is effective, and counting the cumulative lead time value while the predetermined station is in the inactive state; and
converting the inactive state into the active state if the counting is completed.

23. The station power consumption reducing method of claim 22, wherein the active state denotes a state in which a frill power is supplied, and the inactive state denotes a state in which minimum power necessary for conversion into the active sate is supplied.

24. The station power consumption reducing method of claim 22, wherein the producing the self lead time frame comprises:
calculating the self lead time value, which represents the time required by the predetermined station to transmit a data frame to the coordinator, and producing the self lead time frame including the self lead time value; and
transmitting the self lead time frame produced in the calculating the self lead time value to the coordinator.

25. The station power consumption reducing method of claim 22, wherein in the converting the active state of the predetermined station, if the cumulative lead time value is ineffective, the active state of the predetermined station is converted into the inactive state.

26. The station power consumption reducing method of claim 22, wherein in the converting the active state of the predetermined station, the counting is performed by reducing a predetermined unit value from the cumulative lead time value at counting intervals.

27. The station power consumption reducing method of claim 22, wherein the converting the active state of the predetermined station comprises:
converting the active state of the predetermined station into the inactive state, when the self lead time frame has been transmitted to the coordinator in the producing the self lead time frame and the cumulative lead time value is effective; and
counting the cumulative lead time value while the predetermined station is in the inactive state.

28. The station power consumption reducing method of claim 22, further comprising:
converting the inactive state obtained in the converting the active state of the predetermined station into the active state at intervals; and
receiving a beacon frame including a value of one of the intervals from the coordinator, when the predetermined station is in the active state.

29. The station power consumption reducing method of claim 22, further comprising:
receiving a poll frame when the predetermined station is in the active state; and
producing and transmitting a data frame to the coordinator, after a lapse of a predetermined period of time after a reception of the poll frame received in the receiving the poll frame.

30. A power consumption reducing method comprising:
producing a cumulative lead time frame for a predetermined station including a cumulative lead time value, which represents a time required for data transmission by at least one higher priority station having a higher priority than the predetermined station, transmitting the cumulative lead time frame to the predetermined station, receiving a self lead time frame including a self lead time value from the predetermined station, the self lead time value representing a time required for data transmission by the predetermined station, adding the self lead time value included in the self lead time frame to the cumulative lead time value to generate an added cumulative lead time value, and producing a power-save polling list including both the self lead time value and the added cumulative lead time value; and receiving the cumulative lead time frame from a coordinator, producing the self lead time frame, transmitting the self lead time frame to the coordinator, when the predetermined station is in an active state, and converting the active state of the predetermined station into an inactive state if the cumulative lead time value included in the cumulative lead time frame is effective, counting the cumulative lead time value while the predetermined station is in the inactive state, and converting the inactive state of the predetermined station into the active state if the counting is completed.

31. A computer readable recording medium which records a computer program that executes a power-save polling list producing method, the method comprising:

producing a cumulative lead time frame including a cumulative lead time value and transmitting the cumulative lead time frame to a predetermined station, wherein if there is at least one higher priority station having a higher polling priority than the predetermined station, the cumulative lead time value represents a time required for data transmission by the at least one higher priority station;

receiving a self lead time frame including a self lead time value from the predetermined station, wherein the self lead time value represents a time required for data transmission by the predetermined station; and adding the self lead time value included in the self lead time frame to the cumulative lead time value and generating an added cumulative lead time value to produce a power-save polling list, which includes the self lead time value and the added cumulative lead time value.

32. A computer readable recording medium which records a computer program that executes a station power consumption reducing method, the method comprising:

receiving a cumulative lead time frame including a cumulative lead time value from a coordinator, when a predetermined station is in an active state, wherein the cumulative lead time value represents a time required for data transmission by at least one higher priority station having a higher polling priority than the predetermined station;

producing a self lead time frame including a self lead time value and transmitting the self lead time frame to the coordinator, when the predetermined station is in an active state, wherein the self lead time value represents a time required for data transmission by the predetermined station;

converting the active state of the predetermined station into an inactive state, in which less power is consumed than in the active state, if the cumulative lead time value included in the cumulative lead time frame is effective, and counting the cumulative lead time value while the predetermined station is in the inactive state; and converting the inactive state into the active state if the counting in the converting the active state is completed.

33. A computer readable recording medium which records a computer program that executes a power consumption reducing method, the method comprising:

producing a cumulative lead time frame for a predetermined station including a cumulative lead time value, the cumulative lead time value representing a time required for data transmission by at least one higher priority station having a higher priority than the predetermined station, transmitting the cumulative lead time frame to the predetermined station, receiving a self lead time frame including a self lead time value from the predetermined station, the self lead time value representing a time required for data transmission by the predetermined station, adding the self lead time value included in the self lead time frame to the cumulative lead time value to generate an added cumulative lead time value, and producing a power-save polling list including both the self lead time value and the added cumulative lead time value; and receiving the cumulative lead time frame from a coordinator, producing the self lead time frame, transmitting the self lead time frame to the coordinator, when the predetermined station is in an active state, and converting the active state of the predetermined station into an inactive state if the cumulative lead time value included in the cumulative lead time frame is effective, counting the cumulative lead time value while the predetermined station is in the inactive state, and converting the inactive state of the predetermined station into the active state if the counting is completed.

34. A cumulative lead time frame comprising a cumulative lead time field in which a cumulative lead time value is recorded, wherein if there is at least one higher priority station having a higher polling priority than a predetermined station, the cumulative lead time value represents a time required for data transmission by the at least one higher priority station.

35. A self lead time frame comprising a self lead time field in which a self lead time value is recorded, wherein if there is at least one higher priority station having a higher polling priority than a predetermined station, the self lead time value represents a time required for data transmission by the predetermined station.

36. A power-save polling list comprising:

a cumulative lead time field in which a cumulative lead time value is recorded, wherein if there is at least one higher priority station having a higher polling priority over a predetermined station, the cumulative lead time value represents a time required for data transmission by the higher priority stations; and a self lead time field in which a self lead time value is recorded, wherein the self lead time value represents a time required for data transmission by the predetermined station.

37. A computer readable recording medium which records a data structure including a data field of a cumulative lead time frame, the cumulative lead time frame comprising a cumulative lead time field in which a cumulative lead time value is recorded, wherein if at least one higher priority station having a higher polling priority than a predetermined station exists, the cumulative lead time value represents a time required for data transmission by the at least one higher priority station, wherein another station is in an inactive state during the cumulative lead time value to reduce power consumption by the another station.

38. A computer readable recording medium which records a data structure including a data field of a self lead time frame, the self lead time frame comprising a self lead time field in which a self lead time value is recorded, wherein if at least one higher priority station having a higher polling priority than a predetermined station exists, the self lead time value represents a time required for data transmission by the predetermined station, wherein the predetermined station is in an active state during the self lead time value and in an inactive state during a data transmission of the at least one higher priority station to reduce power consumption by the predetermined station.

39. A computer readable recording medium which records a data structure including a data field of power-save polling list, the power-save polling list comprising:

a cumulative lead time field in which a cumulative lead time value is recorded, wherein if at least one higher priority station having a higher polling priority than a predetermined station exists, the cumulative lead time value represents a time required for data transmission by the higher priority stations; and a self lead time field in which a self lead time value is recorded, wherein the self lead time value represents a time required for data transmission by the predetermined station, wherein the predetermined station is in an inactive state during the cumulative lead time value to reduce power consumption by the predetermined station.

* * * * *